United States Patent [19]

Francisco

[11] Patent Number: 4,866,666

[45] Date of Patent: Sep. 12, 1989

[54] METHOD FOR MAINTAINING DATA INTEGRITY DURING INFORMATION TRANSMISSION BY GENERATING INDICIA REPRESENTING TOTAL NUMBER OF BINARY 1'S AND 0'S OF THE DATA

[76] Inventor: Michael H. Francisco, 2780 Churchill Dr., Hillsborough, Calif. 94010

[21] Appl. No.: 68,739

[22] Filed: Jun. 30, 1987

Related U.S. Application Data

[63] Continuation of Ser. No. 665,768, Oct. 29, 1984, abandoned.

[51] Int. Cl.[4] .................. G06F 11/10; G06F 11/30
[52] U.S. Cl. .................................. 364/900; 364/919;
364/942.2; 364/944.9; 364/949.96; 380/25;
371/53; 371/67
[58] Field of Search ... 364/200 MS File, 900 MS File;
371/22, 49, 53, 54, 67; 178/22.01, 22.02, 22.1,
22.09; 340/825.34; 235/379; 380/23.25

[56] References Cited

U.S. PATENT DOCUMENTS

| | | | |
|---|---|---|---|
| 3,458,860 | 7/1969 | Shimabukuro | 371/53 |
| 3,798,605 | 3/1974 | Feistel | 364/900 |
| 4,159,468 | 6/1979 | Barnes et al. | 371/53 |
| 4,291,408 | 9/1981 | Ogawa et al. | 371/49 |
| 4,295,039 | 10/1981 | Stuckert | 235/380 |
| 4,310,720 | 1/1982 | Check, Jr. | 178/22.08 |
| 4,315,101 | 2/1982 | Atalla | 178/22.08 |
| 4,349,695 | 9/1982 | Morgan et al. | 178/22.08 |
| 4,375,102 | 2/1983 | Van Daal | 371/42 X |
| 4,423,287 | 12/1983 | Zeidler | 235/379 |
| 4,471,163 | 9/1984 | Donald et al. | 178/22.08 |
| 4,484,306 | 11/1984 | Kulczyckyj et al. | 364/900 |
| 4,511,975 | 4/1985 | Nozawa et al. | 371/49 X |
| 4,549,075 | 10/1985 | Saada et al. | 235/380 |
| 4,556,958 | 12/1985 | Ugon | 371/49 X |

*Primary Examiner*—Archie E. Williams, Jr.
*Assistant Examiner*—Thomas C. Lee

[57] ABSTRACT

The invention relates to the maintenance of integrity of transmitted messages within a data processing system. The system generates selective message identification indicia based upon the nature and content of the message, transmits the indicia with the message and selective regenerats the identification indicia at the point of message receipt for comparison with the transmitted indicia prior to release of the received message.

2 Claims, 3 Drawing Sheets

|   | ← RANDOM NUMBERS (RN) | | | |
|---|---|---|---|---|
|   | A | B | C | D |
| 0 | 7 | 4 | 3 | 5 |
| 1 | 2 | 1 | 7 | 2 |
| 2 | 5 | 1 | 0 | 8 |
| 3 | 6 | 7 | 1 | 7 |
| 4 | 7 | 8 | 6 | 1 |
| 5 | 0 | 2 | 4 | 3 |
| 6 | 3 | 6 | 8 | 6 |
| 7 | 8 | 0 | 2 | 4 |
| 8 | 1 | 5 | 0 | 2 |
| 9 | 4 | 3 | 3 | 0 |

(rows labeled CONTROL NUMBERS (CN))

FIG. 3A

| A | | B | | C | | D | |
|---|---|---|---|---|---|---|---|
| CN | RN | CN | RN | CN | RN | CN | RN |
| 8 | 4 | 1 | 4 | 6 | 9 | 6 | 4 |
| 7 | 6 | 2 | 3 | 4 | 6 | 6 | 3 |
| 9 | 3 | 4 | 6 | 3 | 8 | 8 | 2 |
| 0 | 8 | 6 | 7 | 9 | 4 | 7 | 6 |
| 3 | 7 | 9 | 4 | 5 | 3 | 5 | 4 |
| 3 | 1 | 8 | 2 | 2 | 5 | 1 | 3 |
| 1 | 3 | 7 | 1 | 1 | 1 | 3 | 2 |
| 2 | 2 | 3 | 5 | 4 | 2 | 4 | 1 |
| 5 | 6 | 2 | 9 | 7 | 2 | 9 | 8 |

FIG. 3B

METHOD FOR MAINTAINING DATA INTEGRITY DURING INFORMATION TRANSMISSION BY GENERATING INDICIA REPRESENTING TOTAL NUMBER OF BINARY 1'S AND 0'S OF THE DATA

This is a continuation of application Ser. No. 665,768, filed Oct. 29, 1984, now abandoned.

This invention relates to data processing system integrity and more particularly to a method for maintaining system integrity during information transmission between remote data processing components.

BACKGROUND OF THE INVENTION

The maintenance of data processing system transmission security and integrity poses ever expanding problems due to the ever increasing utilization of telephone and other conventional commercially available transmission facilities for binary form data transmission and to the increased opportunities for interception, error introduction and for transmission modification. One area of growing concern is the assuring of the exact duplication of the transmitted and received message information and particularly in those instances where such iformation transmission constitutes an intermediate step in a sequence of separate but related and interdependent data processing operations.

SUMMARY OF THE INVENTION

This invention may be briefly described as an improved method for maintaining the integrity of data transmission between discrete separated data processing system components through generation of selective electronic message identification indicia based upon the nature and content of the message, transmittal of such electronic message identification indicia together with the message and regeneration of such electronic message indentification indicia at the point of message receipt for comparison with the transmitted electronic message identification indicia.

Among the advantages of the subject invention is markedly improved message transmission integrity and security that assures immediate recognition of identity of information content between the transmitted and the received messages.

The primary object of this invention is the provision of an improved method of insuring data transmission integrity between separated data processing system components.

Other objects and advantages of the subject invention will become apparent from the following portions of this specification and from the appended drawings which illustrate, in accordance with the mandate of the patent statutes, a presently preferred embodiment of a method incorporating the principles of this invention.

BRIEF DESCRIPTION OF THE DRAWINGS

FIGS. 3A and 3B are illustrative of number matrices utilizable in the practice of the invention.

DESCRIPTION OF THE PREFERRED EMBODIMENTS

Figure 1:
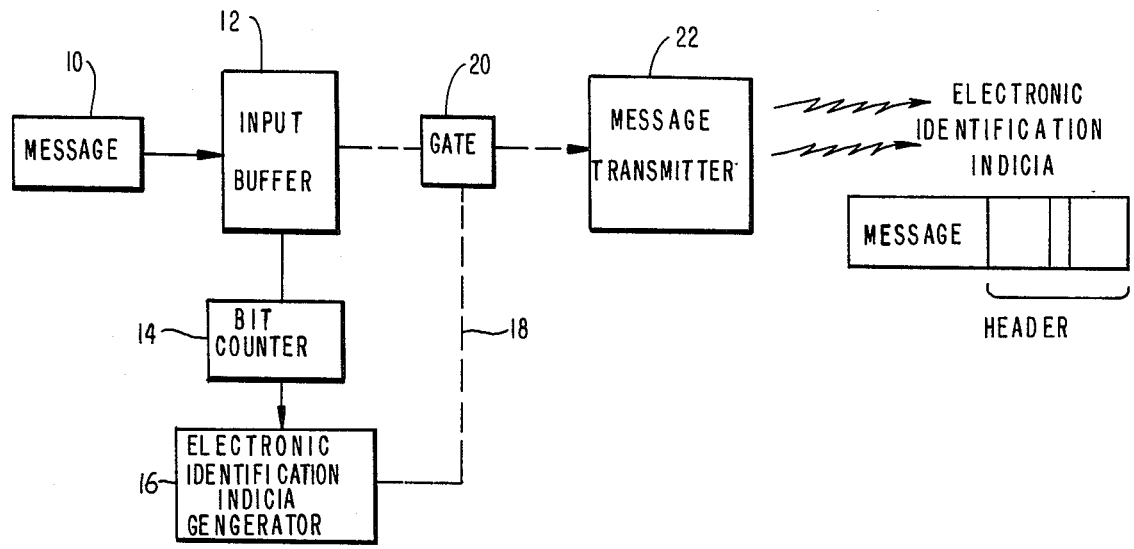
FIG. 1 is a schematic flow diagram illustratively depicting the sequence of message transmission steps involved in the practice of this invention.
Figure 1:
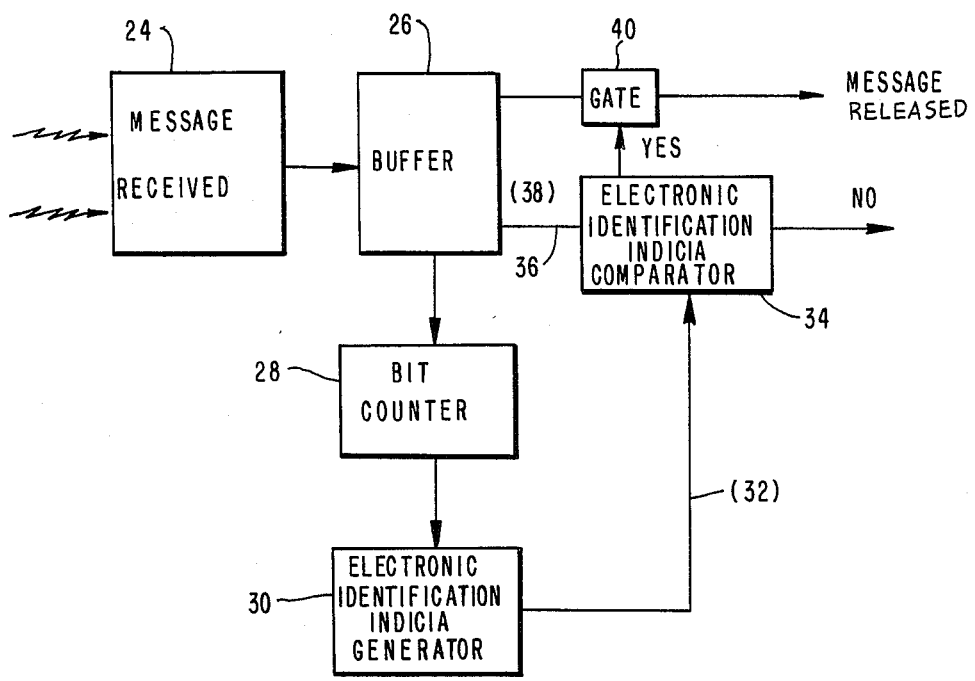

With initial reference to FIG. 1, the practice of the herein described method includes the introduction of a message 10, in binary form, into an input buffer 12 conventionally a memory unit and suitably of the random access type (RAM). A bit counter 14 determines the number of bits in the message. Such bit counter can comprise an automatic logic component of a general purpose digital computer. Such count could be merely the total number of bits or, preferably, the total number of zeros and the total number of ones contained in the body of the message. The output of the bit counter 14 is introduced into an electronic identification indicia generator 16. The generator 16, which is suitably a section of a general purpose digital computer such as an IBM 370 or a suitably preprogrammed microprocessor such as a MOTOROLA 68020 or portion thereof, is adapted to generate a first electronic identification indicia 18 that uniquely and selectively identifies the message to be transmitted. By way of example, in a relatively simple approach thereto, such generator 16 could generate a selective and unique electronic identification indicia by the use of a preprogrammed algorithm in accord with which the total number of "ones" in the message is multiplied by an arbitrary number, e.g. 16; the product of such multiplication could then be divided by the number of "zeros" in the binary coded message; and the remainder thereof modified by addition to (or subtraction of) an arbitrary number, i.e. 4. The resulting number which would constitute the electronic identification indicia for that particular message would then, in all probability, be selectively unique. The algorithm and/or the arbitrary numbers employed therein could be periodically varied to enhance system security.

Such electronic identification indicia 18 is introduced into a message gate 20 wherein it is inserted into the message header and forms a predetermined and readily locatable part of the message passed on to the message transmitter 22 for transmission to a remote location.

After receipt of the transmitted message by the receiver 24, the message, together with its header containing the electronic identification indicia 18, is introduced into a buffer 26, again suitably a random access memory unit. The transmitted message, but not the header portion thereof, is introduced into a bit counter 28, of the type heretofore described, which counts the number of binary bits in the message, suitably for the above example, the number of "zeros" and the number of "ones" therein. The output of the bit counter 28 is introduced into an electronic identification indicia generator 30, again of the type heretofore described, at the receiving station. This generator 30 is preprogrammed to perform the same calculation and to use the same algorithm, as that performed by the generator 16 at the transmitting location. The output of the generator 30, if the transmitted message has not been modified indicia 32 that is identical with the first electronic identifcation 18 generated at the transmitting station and forming a portion of the received message header. Such second generated electronic identification indicia 32 is introduced into a comparator 34, suitably an automatic logic component of a general purpose digital computer, together with the message header from the buffer 26 as indicated at 36. The comparator 34 will then compare the first electronic identification indicia 18 forming a part of the message header with the second electronic identification indicia 32 generated at the receiving station.

If the indicia do not match, a suitable signal can be made to a system monitor and the transmitted message will not be released. In such instance, the sending station can be notified that the message has not been passed and appropriate action, such as regeneration of the same first electronic identification indicia 18 and retransmission of the message, may be initiated. Alternatively, the use of a preprogrammed new algorithm may be employed and an entirely new first electronic identification indicia may be generated for message retransmission purposes.

If, on the other hand, the electronic identification indicia 18 and 32 do match, an appropriate signal is sent to the gate 40, and the transmitted message thereby released for use or other treatment at the receiving location.

Figure 2:
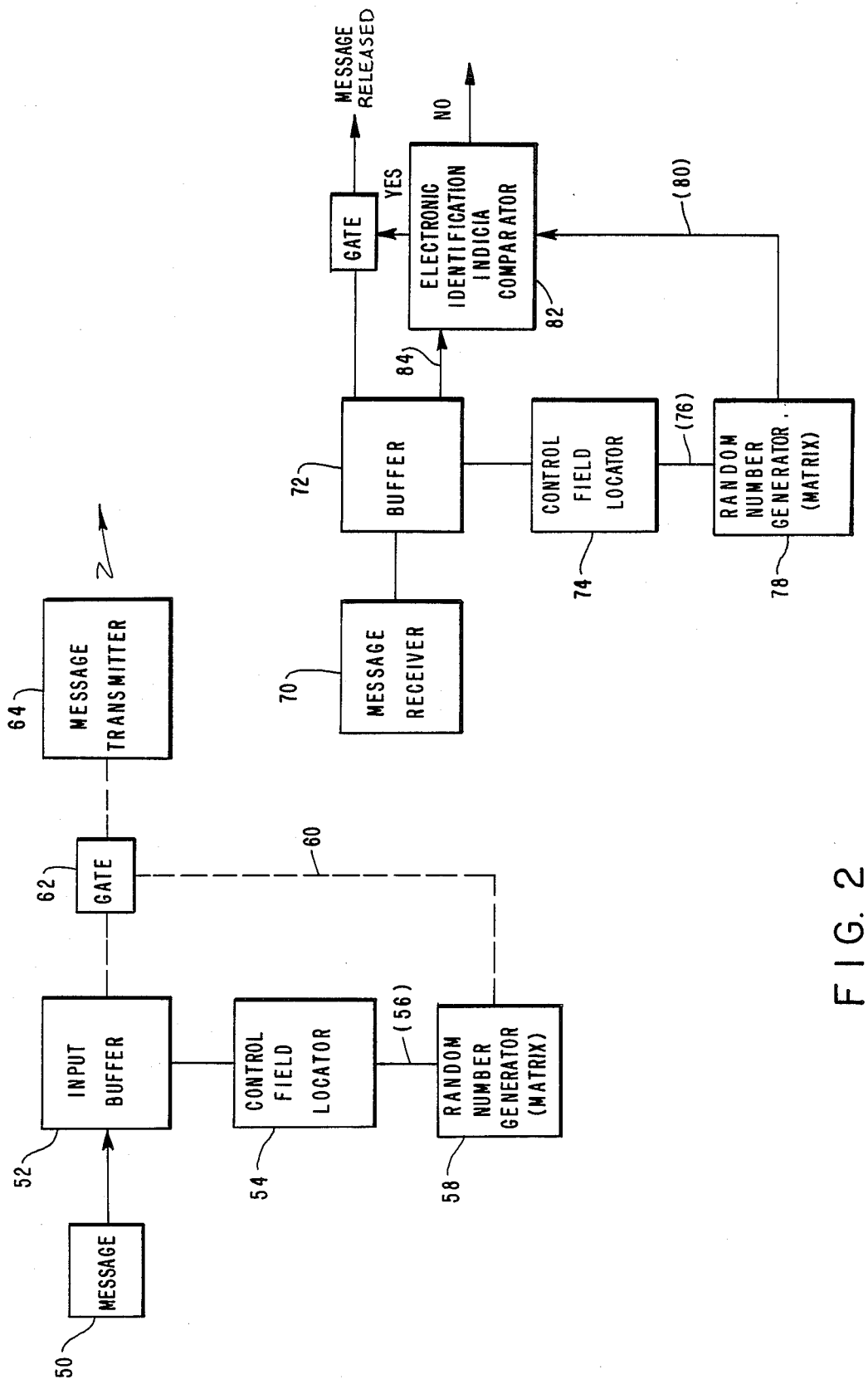
FIG. 2 is a schematic flow diagram illustratively depicting a system employing message identification based upon a message sensitive random number control system.

FIG. 2 is illustrative of a somewhat more complicated system for message transmission integrity employing random number generating techniques for generating the electronic identification indicia.

As there shown, a message 50 in binary form is first introduced into an input buffer 52. A predetermined selected portion of this message, designated as a "control field" is selected by a preprogrammed control field locator 54, suitably an address generator, and such control field 76 is used to address a random number matrix generator. By way of illustrative example, the "control field" could be that particular portion of the message that is located "X" characters from the start thereof and which include the next "N" number of characters to be transmitted. Such control field 56 which will consist of a predetermined number of discrete alphanumeric characters in binary form, is then utilized to address a matrix 58 desirably of a nondeterminative character to generate a random number 60 output therefrom. The random number output 60 of the matrix 58 which is the electronic identification indicia for this particular message is then introduced into a message gate 62. In the gate 62, the electronic identification indicia 60 is inserted into the message header and thus forms a predetermined and readily locatable part of the message that is passed on to the message transmitter 64 for transmission to a remote location.

After receipt of the transmitted message by the message receiver 70, the message, together with its header containing the randomly generated electronic identification indicia 60, is introduced into a buffer 72. The transmitted message, but not the header portion thereof, is introduced into a preprogrammed control field locator 74 which determines the identity of the "control field" in the same manner as that described for the locator component 54 in the transmitting system. When so determined, this control field 76 is again utilized to address a number matrix 78 and to thereby generate a second random number 80 which serves as the second electronic identification indicia for the now received message. As will now be apparent, number matrices 58 and 78 will be identical in configuration.

The second generated electronic identification indicia 80 is introduced into a comparator 82 together with the message header portion of the received message from the buffer 72, as indicated at 84. The comparator 82 then compares the first electronic identification indicia 60 included in the message header with the second electronic identification indicia 80 generated at the receiving station. As previously described, a match between the two indicia will permit message release, and a mismatch will operate to preclude message release.

By way of further example, FIG. 3A illustrates a simple number matric system which may be employed in the generators 58 and 78. As previously described, the "control field" suitably constitutes a predetermined portion of the message that is to be transmitted. For example, the control bit locator may be preprogrammed to advance 80 characters into the message and then to select the next 4 characters as the control field number. If such 4 selected control field number characters are 0-2-5-4, the application thereof to a nondeterminative number matrix such as that shown would result in a translation of the control field number 0-2-5-4 into an electronic identification indicia (6) of 7-1-4-1.

FIG. 3B is illustrative of a somewhat more complicated random number matrix arrangement suitable for use. As here shown, the control field numbers, rather than being static, could be assigned on a basis such that each of the matrix columns A–D would now contain a differently oriented series of control field numbers. If one again uses the control field characters 0-2-5-4, this number generator would translate such control field number into an electronic identification indicia of 8-3-3-1.

As will be apparent to those skilled in this art, the "control field" or the control field number need not necessarily be restricted to integers. Alphabetic or mixed alphabetic and numeric combinations will be used. Such control fields and matrices, while programmed for necessary coincidence at the transmitting and receiving locations, can be changed or preprogrammed for change at any desired interval.

Having thus described my invention, I claim:

I claim:

1. Method for maintaining integrity of binary type object code data messages transmitted between remotely located data processing components in a data processing system and wherein each such message includes a message body uniquely constituted by a multiplicity of discrete multibit characters whose numbers and content is determined by the random nature of the intelligence to be transmitted and a message header, comprising the steps of:

electronically counting total number of binary 1's contained in at least a selected substantial multi-character portion of the message body to be transmitted at a locus of message transmission, electronically counting total number of binary 0's contained in said selected substantial multi-character portion of the message body to be transmitted at the locus of message transmission, generating a relatively short first selective electronic identification indicia in respect to length of the message body at the locus of message transmission uniquely characteristic of said total number of binary 1's and total number of binary 0's in said selected multi-character portion of said message body to be transmitted by application of a predetermined algorithm to said electronically counted total number of binary 1's and total number of binary 0's in said selected multi-character portion of said message body to be transmitted, incorporating said first selective electronic identification indicia into the message header, transmitting said message body and message header to a remote data processing component, electronically counting the total number of binary 1's contained in said selected multi-character portion of said message body at a locus of message reception, electronically counting the total number of binary 0's contained in said selected multi-character portion of said message body at the locus of message reception, generating a second selective electronic identification indicia at the locus of message reception uniquely characteristic of said electronically counted total number of binary 1's and total number of binary 0's in said selected multi-character portion of the received message body by application of said predetermined algorithm to said total number of binary 1's and total number of binary 0's in said selected multi-character portion of said received message body, and authenticating said received message at the locus of message reception when said first and second selectively generated electronic identification indicia are identical to each other.

2. The method as set forth in claim 1 wherein said first and second electronic identification indicia are generated by utilization of the number of binary 1's and binary 0's contained in said selected multi-character portion of said message body to address a predetermined number matrix at the loci of message transmission and reception to generate a random number constituting said transmittable electronic identification indicia.

* * * * *